United States Patent Office 2,960,174
Patented Nov. 15, 1960

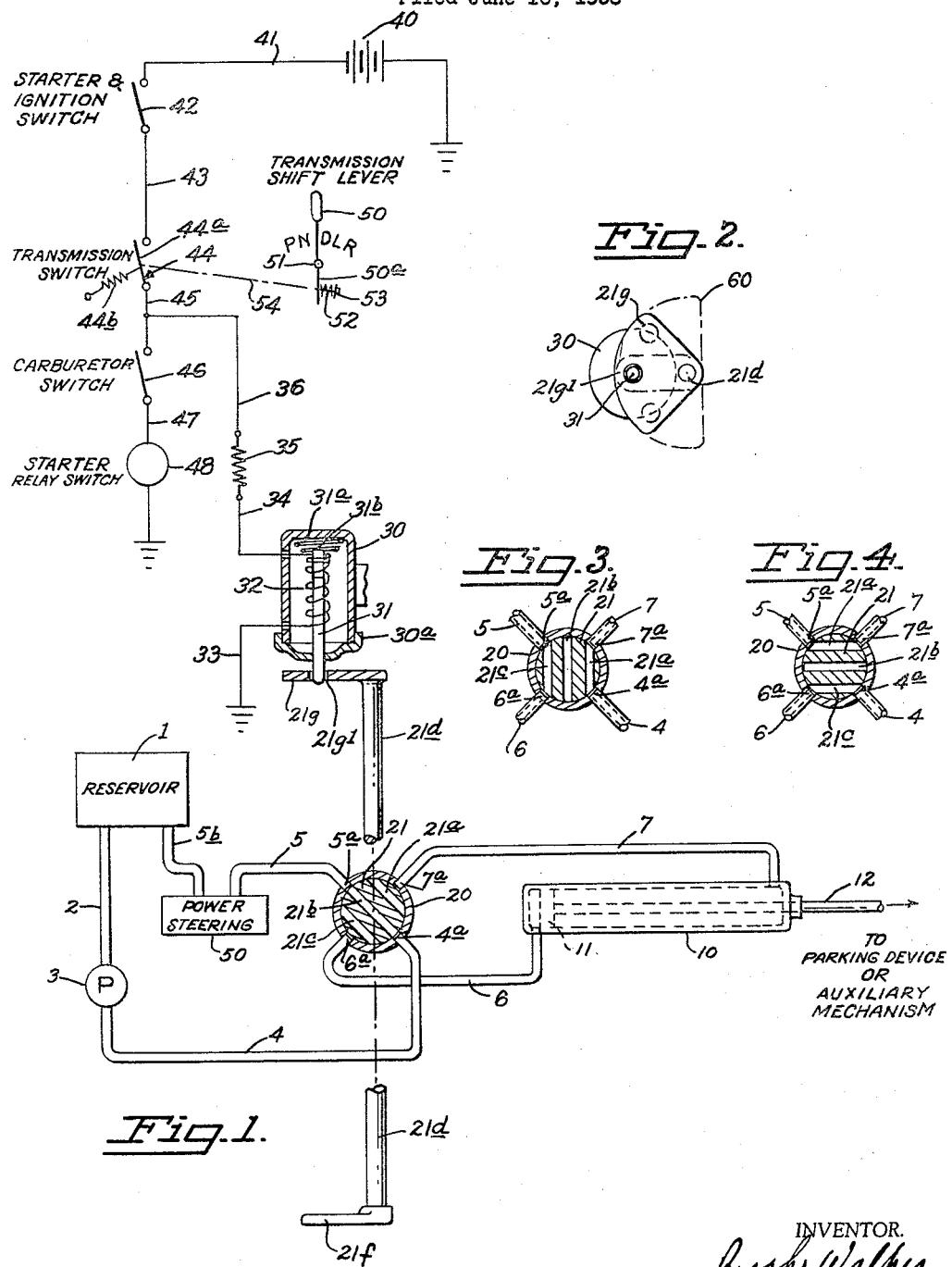

2,960,174

SAFETY DEVICE FOR PREVENTING OPERATION OF CERTAIN AUTOMOBILE - ENGINE - OPERATED HYDRAULIC DEVICES DURING DRIVE POSITIONS OF AUTOMATIC TRANSMISSION

Brooks Walker, 1280 Columbus Ave.,
San Francisco 11, Calif.

Filed June 16, 1958, Ser. No. 742,238

5 Claims. (Cl. 180—82)

This invention pertains to a safety device for a hydraulic control for such devices as a parking device, hydraulic jack, power operated top or such other device as should be operated only when the vehicle is standing still and/or in neutral with engine turned on.

Other devices have operated on mechanical slide gear shifts such as my U.S. Patent No. 1,742,566, entitled "Parking Device" (see Figs. 10 and 11), dated January 7, 1930, and prevented operation except when all other driving gears were out of mesh or when a manually shifted transmission was in neutral as far as the drive shaft is concerned.

Another device unlocks the hydraulic parking device lift control when pressure is raised in the hydraulic brake line and is shown in pending U.S. application, Serial No. 384,633, now abandoned, entitled "Motor Vehicle Lifting and Traversing Device" (see Fig. 4).

Another device that unlocks the hydraulic control when the hand brake is firmly set is shown in U.S. patent application Serial No. 718,915, entitled "Fluid Supply Means for Operating Automobile Devices" (see Fig. 6). Lock out controls that unlock on brake pressure allow side travel of a parking device during the raising operation if the engine is speeded up during raising for a faster lift if the automatic transmission control is in a forward or reverse position before and during the lifting operation. This is not as desirable as the lock out proposed herein.

With most automatic transmissions there are two switches in series between the ignition switch and the starter relay. The first switch on or connected with the transmission is closed when the transmission shift lever is in "neutral" position (and also on some transmission controls when in "park" position). The second switch which is near the carburetor or intake manifold and is intake manifold vacuum operated is opened when there is a substantial vacuum in the intake manifold. This construction is shown in the instruction manual for a 1952 Packard and is used on many other production cars. The reason for this control is that when the ignition is turned on and the transmission switch is closed by placing the shift control in "neutral" or "park" the starter will be energized unless the carburetor switch is opened by the intake manifold partial vacuum resulting from the engine when running. This control starts the motor if it is stopped and prevents the starter from being energized when the engine is running which might damage the starter mechanism.

This invention has as a main purpose the electrically controlled lock out of the controls for an automotive auxiliary hydraulically operated device, unless the automatic transmission shift lever is in neutral.

Another purpose is to accomplish the desired result without the need of another control switch or mechanism for operating the extra switch. If this control is used on the controls for the hydraulic lift of a parking device such as shown in my U.S. patent application Serial No. 384,633, but with an automatic transmission as used on a 1952 Packard the transmission shift lever is placed in neutral position until after the lifting operation is complete. After the lift is complete the rear of the car can be swung either to the right or left by the use of a forward or reverse rotation of the drive shaft and the rear wheels as controlled by the transmission shift lever and foot brake.

After and during such a swinging operation the lifting device will be locked by solenoid plunger 31 against retraction of the parking device, unless the shift lever is returned to neutral. When the shift lever is in neutral the solenoid will be energized and unlocked so that valve 20 can be operated for the retracting operation. This control would also prevent the operation of a hydraulically operated jack, etc. unless automatic transmission shift lever were in neutral or park position.

The simplicity and flexibility of location of such a lock out is another feature of this invention.

Other features will be more particularly pointed out in the accompanying specification and claims.

I have illustrated my invention by way of example in the accompanying drawing in which:

Fig. 1 is a schematic diagram showing one form of the invention with some parts in section.

Fig. 2 is an end view of the valve lock plate shown in Fig. 1.

Fig. 3 is a cross section of the valve shown in Fig. 1 but in a position to move the piston of Fig. 1 to the right as viewed in Fig. 1.

Fig. 4 is similar to Fig. 3 but with the valve in the position to move the piston to the left.

In all figures like numerals of reference refer to corresponding parts.

In Figs. 1, 2, 3, and 4 I have shown a fluid reservoir 1 connected to a pump 3 by line 2. Line 4 connects to valve 20 at port 4a. Valve 20 has a port 5a connected to line 5 which returns to reservoir 1. Port 4a is connected to port 5a by passage 21b to make a valve 4 an open center valve. Line 5 could go to reservoir 1 directly or to power steering unit 50 and on to reservoir 1 through line 5b.

Hydraulic cylinder 10 has piston 11 and piston rod 12 which can operate a parking device, hydraulic jack, automatic top or any other device. One end of cylinder 10 is connected to valve 20 by line 6 and port 6a. The other end of cylinder 10 is connected by line 7 and port 7a to valve 20, in the position shown in Fig. 1. The cylinder 10 is locked off from the pump and reservoir in the open center position of valve 21, as shown in Figs. 1 and 2. Control rods 24d extend from one or both ends of valve rotor 21 (valve 20 has been shown in one plane and control rods in another in Fig. 1), and control the rotation of valve core 21 inside valve 20 by handle 21f. Valve lock plate 21g is secured to valve control rod 21d and has opening 21gl which meshes with solenoid plunger 31 to effect a locking of valve 20 to prevent the hydraulic piston 11 and rod 12 from operating the auxiliary device until the solenoid 30 is energized.

The vehicle has a battery 40, one side of which is connected to ground, and the other to an ignition (starter control) switch 42 by line 41. Line 43 connects to transmission switch 44 which is operated by the automatic transmission lever 50 to be closed only when the lever is in "neutral" or "park" position. Transmission shaft lever 50 is pivoted at 51 and lower end 50a has a hole through which insulated cord 54 passes. Cord 54 is connected to switch blade 44a which is urged toward the open position by spring 44b. When shift lever 50 is moved to neutral "N" position, switch 44 will be closed and when moved farther to park "P" position, the spring 52 will compress and switch 44 will remain closed. Switch 44 will be open in drive "D," low "L," or reverse "R" position. Wire 45 connects switch 44 with vacuum operated carburetor switch 46. Wire 47 connects starter relay 48 to switch 46. This is a conventional control of this transmission switch and starter relay. Wire 36 is connected through a resistance 35 to line 34 to coil 32 in solenoid 30 and by line 33 to ground. Solenoid 30 has a body and base 30a, and a stem 31 urged to an extended position by spring 31a. A portion 31b at the top of stem 31 as viewed in Fig. 1 is preferably of non-magnetic material such as plastic, wood, brass, etc. When coil 32 is energized, plunger 31 is withdrawn from the opening 21gl in plate 21g to unlock the operation of valve 20 to allow operation of piston rod 12 and the auxiliary device. Solenoid 30 may be mounted on plate 60.

After the valve 20 has been unlocked and piston 11 has moved to the end of its stroke, valve 20 is returned to open center position shown in Fig. 1 and the shift lever for the automatic transmission is placed in low or reverse to control traversing with valve 20 locked in the open center position until the automatic transmission shift lever 50 is again moved to "neutral" or "park" position.

In operation, when applied to an automatic top the lever 50 is placed in "neutral" or "park." The valve 20 is moved by handle 21f to operate the piston 11 in one direction (say to raise the top). To accomplish this the valve 20 is placed in the position shown in Fig. 4 where passage 21c connects port 4a with pressure from pump 3 to port 6a, line 6, to the lift end of cylinder 10, as viewed in Fig. 1. Passage 21 will connect port 7a to port 5a so that fluid from the right hand end of cylinder 10 will flow through pipe 7, port 7a, passage 21a to port 5a, pipe 5, power steering 50, line 5b to reservoir 1. When this operation is complete the valve is returned to open center position and again locked when the automatic transmission shift lever 50 is in the position other than "neutral" or "park." The lowering of the top can again be effected only when the transmission control is in "neutral" or "park," by placing the valve in the position shown in Fig. 3. In this position, oil from pump 3 flows through pipe 4, port 4a, passage 21a, port 7a, pipe 7, to cause piston 11 to move to the left, as viewed in Fig. 1. Oil from the head of cylinder 10 will flow through pipe 6, port 6a, passage 21c, port 5a, pipe 5, power steering, pipe 5b to reservoir 1.

Other features of the invention will be more particularly pointed out in the accompanying claims. To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A control system for an auxiliary hydraulically controlled device on a vehicle having an automatic transmission, a transmission shift actuator means, a transmission switch controlled by said shift actuator means and open when said shift actuator means is in driving position relative to said transmission, and control means for actuating said hydraulically controlled device, said system comprising lock-out means for said control means and electrically operated means in series with said transmission switch for deactuating said lock-out means when said transmission switch is closed, said lock-out means thereby being effective to prevent operation of said control means when said transmission switch is open.

2. The control system of claim 1 having an ignition switch in series with said transmission switch and said electrically operated means, whereby said lock-out means is also effective as a lock out when said ignition switch is open.

3. The control system of claim 1 wherein said control means includes a shaft that makes a partial rotation in effecting the full cycle control for said device and said lock-out means includes an intercept device that prevents rotation of said shaft when said lock-out means is effective.

4. In a vehicle having an automatic transmission, a transmission, a transmission shift lever, a transmission switch controlled by a shift lever so as to be open when said shift lever is in driving position relative to said transmission and closed when said shift lever is in neutral and parking positions, a hydraulic system, an auxiliary hydraulically controlled device in said system, and valve means for actuating said hydraulically controlled device, the combination therewith of a rotatable lever mounted on said valve means for operating said valve means, a plate mounted on said rod and having an opening therethrough spaced from said rod, and a solenoid having a coil in series with said transmission switch and a core that normally extends through said opening to lock said lever against rotation when said transmission switch is open and is retracted from said opening when said transmission switch is closed so that said lever can then be operated.

5. The device of claim 4 wherein an ignition switch is in series with said transmission switch and said solenoid coil whereby said core remains in said opening when said ignition switch is open, regardless of the position of said shift lever.

References Cited in the file of this patent

UNITED STATES PATENTS

| | | |
|---|---|---|
| 2,248,747 | Dick | July 8, 1941 |
| 2,626,003 | Kutzer | Jan. 20, 1953 |
| 2,672,203 | Brown | Mar. 16, 1954 |
| 2,740,947 | Davies | Apr. 3, 1956 |